(12) United States Patent
Okonski et al.

(10) Patent No.: US 11,358,328 B2
(45) Date of Patent: Jun. 14, 2022

(54) COMPOSITE FUSION FILAMENT

(71) Applicant: GM GLOBAL TECHNOLOGY OPERATIONS LLC, Detroit, MI (US)

(72) Inventors: David A. Okonski, Waterford, MI (US); Ryan Gergely, Fraser, MI (US); Blair E. Carlson, Ann Arbor, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 16/355,186

(22) Filed: Mar. 15, 2019

(65) Prior Publication Data
US 2020/0290269 A1  Sep. 17, 2020

(51) Int. Cl.
| | |
|---|---|
| *B29C 64/165* | (2017.01) |
| *B33Y 70/00* | (2020.01) |
| *B29C 64/295* | (2017.01) |
| *B29C 64/209* | (2017.01) |
| *B29C 70/38* | (2006.01) |

(Continued)

(52) U.S. Cl.
CPC .......... *B29C 64/165* (2017.08); *B29C 64/209* (2017.08); *B29C 64/295* (2017.08); *B29C 70/384* (2013.01); *B33Y 10/00* (2014.12); *B33Y 70/00* (2014.12); *C08J 7/0427* (2020.01); *B29K 2067/003* (2013.01); *B29K 2077/00* (2013.01); *B29K 2267/003* (2013.01); *B29K 2267/04* (2013.01); *B29K 2995/0041* (2013.01); *C08J 2367/02* (2013.01); *C08J 2377/00* (2013.01); *C08J 2467/02* (2013.01); *C08J 2477/00* (2013.01)

(58) Field of Classification Search
CPC ... B29C 64/165; B29C 64/209; B29C 64/295; B29C 64/118; B29K 2267/003; B29K 2267/04; B29K 2995/0041; C08J 2377/00; C08J 2467/02; C08J 2477/00
See application file for complete search history.

(56) References Cited

U.S. PATENT DOCUMENTS

| | | | |
|---|---|---|---|
| 5,395,470 A | * | 3/1995 | Toh ..................... B29C 66/8362 156/244.11 |
| 5,753,736 A | | 5/1998 | Bhat et al. |

(Continued)

*Primary Examiner* — Nahida Sultana
(74) *Attorney, Agent, or Firm* — Vivacqua Crane, PLLC (57) ABSTRACT

A composite fusion filament is disclosed that includes a polymer encasement and one or more mesogenic reinforcement bodies contained within the polymer encasement. The polymer encasement is comprised of a thermoplastic polymer, which has a melting temperature, and each of the one or more mesogenic reinforcement bodies is comprised of a thermotropic liquid crystal polymer, which has a clearing temperature. The melting temperature of the thermoplastic polymer included in the polymer encasement is less than the clearing temperature of the thermotropic liquid crystal polymer included in the one or more mesogenic reinforcement bodies. Additionally, the thermotropic liquid crystal polymer of each mesogenic reinforcement body has a plurality of organized crystalline fibrils that are aligned lengthwise along a longitudinal axis of the polymer encasement. A method of using the composite fusion filament to form a bond with a substrate that includes a thermoplastic polymer is also disclosed.

18 Claims, 4 Drawing Sheets

(51) Int. Cl.
*B33Y 10/00* (2015.01)
*C08J 7/04* (2020.01)
*B29K 77/00* (2006.01)
*B29K 67/00* (2006.01)
*B29K 267/00* (2006.01)

(56) References Cited

U.S. PATENT DOCUMENTS

| | | | |
|---|---|---|---|
| 6,207,273 | B1 | 3/2001 | Kurihara et al. |
| 6,254,987 | B1 * | 7/2001 | Delker ................ D01F 8/14 428/370 |
| 9,096,794 | B2 * | 8/2015 | Nair ................ C09K 19/322 |
| 2005/0069703 | A1 * | 3/2005 | He ..................... D04C 1/12 428/395 |
| 2008/0095507 | A1 * | 4/2008 | Mahapatra ........ C03C 25/1065 385/102 |
| 2014/0291886 | A1 * | 10/2014 | Mark ................. B29C 69/001 264/163 |
| 2016/0041357 | A1 * | 2/2016 | White ................ G02B 6/4475 385/115 |
| 2020/0048043 | A1 * | 2/2020 | Zhao ................. D07B 1/162 |
| 2020/0156310 | A1 * | 5/2020 | Shah ................. B29C 64/118 |
| 2020/0290269 | A1 * | 9/2020 | Okonski ............. D01D 5/34 |
| 2022/0081804 | A1 * | 3/2022 | Lundin ............... C09K 19/54 |

* cited by examiner

COMPOSITE FUSION FILAMENT

INTRODUCTION

Manufacturing processes are becoming ever more sophisticated. For example, the manufacture of multi-component articles may require two workpiece members—at least one of which may be formed from a composite material—to be secured together. In the assembly of an automobile, prefabricated composite workpiece members may be implemented at various locations throughout the vehicle in an effort to selectively reduce overall vehicle weight without sacrificing the integrity and performance of the vehicle when in use. Several examples of automobile component parts that may be designed into a vehicle as a composite workpiece member are hoods, quarter panels, fenders, and truck boxes. The composite workpiece members employed for these and other applications typically comprise a thermoplastic polymer matrix reinforced with embedded filler materials such as fibers and/or particles. While the use of composite workpiece members has some advantages over their more-conventional metal counterparts, the process for securing a composite workpiece member to another workpiece member (composite or non-composite) is usually more time-consuming and laborious compared to metal joining techniques since some form of mechanical fastening is needed to firmly hold the workpiece members together. The present disclosure describes a composite fusion filament that can enable the expedient joining of a composite workpiece member. The disclosed composite fusion filament may have other uses as well. Notably, the composite fusion filament may be used as a feed filament for an additive manufacturing process known as fused deposition modeling.

SUMMARY OF THE DISCLOSURE

A composite fusion filament according to practices of the present disclosure includes a polymer encasement and one or more mesogenic reinforcement bodies contained within the polymer encasement. The polymer encasement has a longitudinal axis, along which a length of the composite fusion filament is defined, and is comprised of a thermoplastic polymer that has a melting temperature. The one or more mesogenic reinforcement bodies are comprised of a thermotropic liquid crystal polymer having organized crystalline fibrils aligned lengthwise along the longitudinal axis of the polymer encasement. The thermotropic liquid crystal polymer of the one or more mesogenic reinforcement bodies has a clearing temperature that is greater than the melting temperature of the thermoplastic polymer of the polymer encasement.

The composite fusion filament may be further defined. For example, the melting temperature of the thermoplastic polymer may be between 160° C. and 350° C., and the clearing temperature of the thermotropic liquid crystal polymer may be between 250° C. and 400° C. As another example, the melting temperature of the thermoplastic polymer may be between 240° C. and 280° C., and the clearing temperature of the thermotropic liquid crystal polymer may be between 280° C. and 310° C. Still further, the thermoplastic polymer may be an aliphatic polyamide or polyethylene terephthalate. As for the thermotropic liquid crystal polymer, it may be poly(hydroxybenzoic acid) or poly(1,4-phenylene terephthalate). The thermotropic liquid crystal polymer may also be a co-polyester. To that end, the thermotropic liquid crystal polymer may be poly(4,4'-dihydroxybiphenyl-co-terephthalic acid), poly(4,4'-dihydroxybiphenyl-co-terephthalic acid-co-isophthalic acid), poly(hydroxybenzoic acid-co-2-hydroxy-6-naphthoic acid), poly(ethylene terephthalate-co-hydroxybenzoic acid), or poly(p-acetoxybenzoic acid-co-ethylene terephthalate). The thermotropic liquid crystal polymer may also be a co-polyester-amide. To that end, the thermotropic liquid crystal polymer may be poly(6-hydroxy-2-naphthoic acid-co-terephthalic acid-co-4 aminophenol).

Additionally, when the composite fusion filament is sectioned perpendicular to the length of the filament, a ratio of a sectional surface area of the polymer encasement to a sectional surface area of the one or more mesogenic reinforcement bodies may range from 0.1 to 20. In another implementation, the ratio of the sectional surface area of the polymer encasement to the sectional surface area of the one or more mesogenic reinforcement bodies may range from 1 to 2. The thickness of the polymer encasement may range from 1.0 mm to 10.0 mm. And, in one implementation, the polymer encasement has an outer surface that defines an outer diameter of the composite fusion filament.

The exact shape and construction of the composite fusion filament may vary. For instance, the polymer encasement may be an annular polymer shell, and the one or more mesogenic reinforcement bodies may be a single elongated liquid crystal polymer core that is surrounded circumferentially by the annular polymer shell and is coextensive in length with the annular polymer shell. Alternatively, the polymer encasement may include an annular polymer shell portion, and the one or more mesogenic reinforcement bodies may be a series of elongated liquid crystal polymer cores that are in axial alignment along the longitudinal axis of the polymer encasement. As another option, the polymer encasement may include an annular polymer shell portion, and the one or more mesogenic reinforcement bodies may be a plurality of continuous elongated liquid crystal polymer cores that are spaced apart within the polymer encasement and surrounded by the annular polymer shell portion of the polymer encasement, with each of the plurality of continuous elongated liquid crystal polymer cores being coextensive in length with the polymer encasement. In yet another example, the polymer encasement may include an annular polymer shell portion, and the one or more mesogenic reinforcement bodies may be multiple series of elongated liquid crystal polymer cores that are in axial alignment along the longitudinal axis of the polymer encasement.

A method of deposition a composite fusion filament is also disclosed. The method may include several steps according to one embodiment of the present disclosure. One step involves feeding a composite fusion filament to a fusion deposition head that includes a liquefier and a nozzle. The composite fusion filament comprises a polymer encasement and one or more mesogenic reinforcement bodies contained within the polymer encasement. The polymer encasement is comprised of a thermoplastic polymer having a melting temperature, and the one or more mesogenic reinforcement bodies are comprised of a thermotropic liquid crystal polymer having a clearing temperature that is greater than the melting temperature of the thermoplastic polymer. Another step of the method involves heating the composite fusion filament in the liquefier to a processing temperature that is above the melting temperature of the thermoplastic polymer of the polymer encasement yet below the clearing temperature of the thermotropic liquid crystal polymer of the one or more mesogenic reinforcement bodies. Still another step of the method involves depositing the composite fusion filament onto a substrate comprising a thermoplastic polymer that is compatible with the thermoplastic polymer of the polymer encasement of the composite fusion filament. Yet another step of the method involves allowing a deposited molten form of the polymer encasement of the composite fusion filament and a melted contact portion of the thermoplastic polymer of the substrate to harden into a polymer bond.

DETAILED DESCRIPTION

A composite fusion filament is disclosed that includes a thermoplastic polymer encasement and one or more mesogenic reinforcement bodies contained within the thermoplastic polymer encasement. Each of the one or more mesogenic reinforcement bodies comprises a thermotropic liquid crystal polymer having organized crystalline fibrils aligned lengthwise along a longitudinal axis (length dimension) of the polymer encasement. The one or more mesogenic reinforcement bodies may be in the form of a single continuous elongated liquid crystal polymer core (FIGS. 1-2), a series of elongated liquid crystal polymer cores in axial alignment (FIG. 6), a plurality of continuous elongated liquid crystal polymer cores (FIGS. 7-8), or multiple series of elongated liquid crystal polymer cores in axial alignment (FIG. 9). The composite fusion filament may be produced with any one of these implementations of the one or more mesogenic reinforcement bodies by coextrusion as the heat and shearing forces applied to the filament during coextrusion help promote crystallization and orientation of the crystalline fibrils.

Each of the thermoplastic polymer employed in the polymer encasement and the thermotropic liquid crystal polymer employed in the one or more mesogenic reinforcement bodies may be selected from a variety of suitable candidates so long as the thermoplastic polymer has a melting temperature that is less than a clearing temperature of the thermotropic liquid crystal polymer. This relationship between the melting temperature of the thermoplastic polymer and the clearing temperature of the thermotropic liquid crystal polymer allows the composite fusion filament to be heated to a temperature at which the polymer encasement melts and experiences viscous flow while the thermotropic liquid crystal polymer of each mesogenic reinforcement body retains an anisotropic liquid crystal state. The ability to melt the polymer encasement of the composite fusion filament while the one or more mesogenic reinforcement bodies remain structurally intact enables the filament, via the melted polymer encasement, to bond with a compatible thermoplastic polymer of a substrate onto which the filament is deposited while maintaining, via the one or more mesogenic reinforcement bodies, a manipulable fibrous form.

The composite fusion filament can be heated and selectively applied by any applicable deposition technique to a substrate to facilitate bonding therebetween provided the substrate includes a thermoplastic polymer that is compatible with the thermoplastic polymer that constitutes the polymer encasement of the fusion filament. Thermoplastic polymers are compatible if they have the same polymer composition such as, for example, if the thermoplastic polymers are both polycaprolactam (polyamide 6, PA 6, or Nylon 6), since polymers of the same composition can simply intermix without causing any changes in chemistry or properties. Thermoplastic polymers are also considered compatible if the polymers have different polymer compositions but are nonetheless miscible in that the polymers, when mixed, form a single-phase blend that exhibits one glass transition temperature. An example of compatible thermoplastic polymers that have different polymer compositions is polybutylene terephthalate (PBT) and polyethylene terephthalate (PET).

Figure 1:
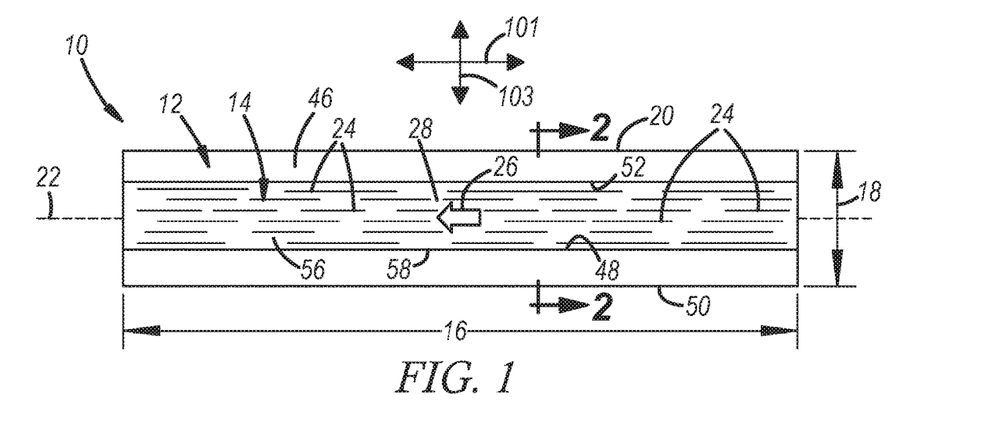
FIG. 1 is a partial cross-sectional view of a composite fusion filament according to one embodiment of the present disclosure with the filament being sectioned along a length dimension.
Figure 2:
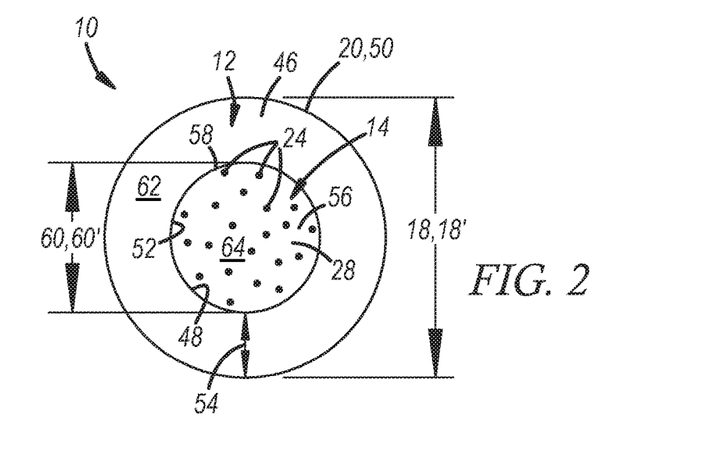
FIG. 2 is a cross-sectional view of the composite fusion filament according to the embodiment of FIG. 1 with the filament being sectioned along a thickness dimension taken at section lines 2-2 of FIG. 1.

Referring now to FIGS. 1-2, a composite fusion filament 10 according to one embodiment of the present disclosure is depicted. The composite fusion filament 10 includes a polymer encasement 12 and one or more mesogenic reinforcement bodies 14 contained within the polymer encasement 12. The composite fusion filament 10 has a length dimension 101 and a thickness dimension 103. The length dimension 101 is the most extended dimension of the filament 10, along which a length 16 of the filament 10 is measured, and the thickness dimension 103 is the largest dimension of the filament 10 in a sectional plane oriented perpendicular to the length dimension 101, along which a thickness 18 of the filament 10 is measured. The composite fusion filament 10 is preferably circular in cross-section, as shown here, such that the thickness 18 of the filament 10 is simply an outer diameter 18' of the filament 10. In alternative implementations, the composite fusion filament 10 may assume other cross-sectional shapes such as square, hexagonal, octagonal, to name but a few options. The length 16 of the composite fusion filament 10 may be greater than the thickness 18 of the filament by a factor of at least 100. And while the length 16 of the composite fusion filament 10 can vary greatly, in many instances a large-scale length is preferred so that the filament 10 can be spooled for ease of use.

The polymer encasement 12 is comprised of a thermoplastic polymer that may optionally include a reinforcing filler (not shown). The polymer encasement 12 has an outer surface 20 and, beneath that outer surface 20, carries the one or more mesogenic reinforcement bodies 14 and also positionally fixes the one or more mesogenic reinforcement bodies 14 relative to each other if more than one body 14 is present. The outer surface 20 of the polymer encasement delineates the cross-sectional shape of the composite fusion filament 10. The sectional profile of the outer surface 20 establishes the thickness dimension 103 of the filament 10 and, in turn, defines the thickness 18 of the filament 10. Additionally, the polymer encasement 12 has a longitudinal axis 22. The extension of the polymer encasement 12 along the longitudinal axis 22 establishes the length dimension 101 of the filament 10 and, thus, defines the length 16 of the filament 10. The specific size and shape of the polymer encasement 12 may vary depending on a variety of factors including the intended end-use of the composite fusion filament 10, the expected processing window of the filament 10, and the desired properties of the filament 10 at room and elevated processing temperatures.

Each of the one or more mesogenic reinforcement bodies 14 is comprised of a thermotropic liquid crystal polymer that may optionally include a reinforcing filler (not shown). The thermotropic liquid crystal polymer of each body 14 has a plurality of organized crystalline fibrils 24 that constitute regions of ordered mesogenic units of the polymer molecules. The organized crystalline fibrils 24 are aligned lengthwise along the longitudinal axis 22 of the polymer encasement 12; that is, the long axes of the crystalline fibrils 24 exhibit orientation alignment along the longitudinal axis 22 of the polymer encasement 12 such that a director 26 (or common axis) of the fibrils 24 runs parallel to the longitudinal axis 22. The crystalline fibrils 24 are distributed throughout the liquid crystal polymer. The fibrils 24 may be axially and radially spaced from each other, which, as shown, can result in the fibrils being interleaved in that a portion of the long axis of one or more of the fibrils 24 overlaps with portion of the long axis of one or more other fibrils 24. The thermotropic liquid crystal polymer has a crystallinity (i.e., the ratio of the volume of crystalline fibrils to the total volume of the liquid crystal polymer expressed as a percentage) that may range from 50% to 100%, with the remainder being amorphous regions 28 of the liquid crystal polymer. The plurality of organized crystalline fibers 24, which may be formed to a specified crystallinity by the application of heat and shear, impart anisotropy to each of the mesogenic reinforcement bodies 14.

Figure 3:
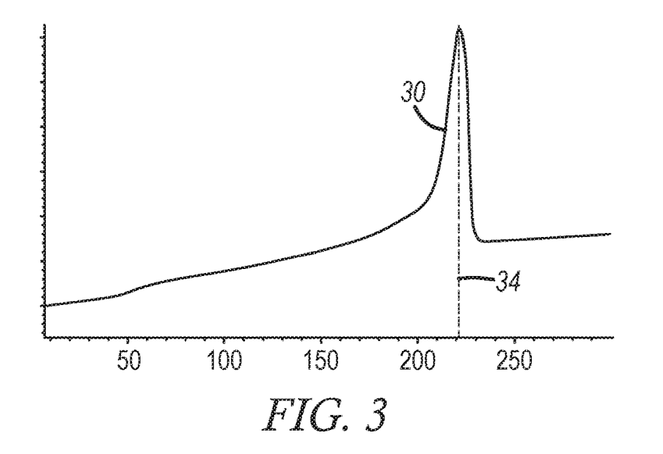
FIG. 3 is a DSC curve for polycaprolactam (PA6) in which the y-axis represents heat flow and the x-axis represents temperature in degrees Celsius, and wherein upward movement on the y-axis represents an endothermic event and downward movement on the y-axis represents an exothermic event.
Figure 4:
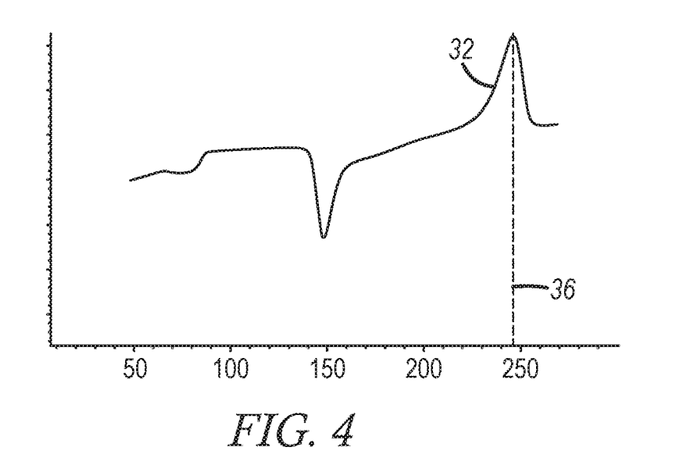
FIG. 4 is a DSC curve for polyethylene terephthalate (PET) in which the y-axis represents heat flow and the x-axis represents temperature in degrees Celsius, and wherein upward movement on the y-axis represents an endothermic event and downward movement on the y-axis represents an exothermic event.

The compositions of thermoplastic polymer included in the polymer encasement 12 and the thermotropic liquid crystal polymer included in the one or more mesogenic reinforcement bodies 14 are selected so that a melting temperature ($T_M$) of the thermoplastic polymer is less than a clearing temperature ($T_C$) of the thermotropic liquid crystal polymer. The melting temperature ($T_M$) of the thermoplastic polymer is the peak melting temperature, or melt point, of the thermoplastic polymer and can be determined by differential scanning calorimetry (DSC). For example, FIG. 3 shows a DSC curve for polycaprolactam (PA6) and FIG. 4 shows a DSC curve for polyethylene terephthalate (PET). The melting endotherm 30 for PA6 and the melting endotherm 32 for PET provide thermal information relating to the phase transition of their respective polymers into, upon heating, an isotropic liquid in which the polymer molecules are disordered and the polymer can experience viscous flow. The melting temperature ($T_M$) for each of PA6 (identified by the dashed line indicated by reference numeral 34) and PET (identified by the dashed line indicated by reference numeral 36) is the temperature that corresponds to the peak of their respective melting endotherms 30, 32.

Figure 5:
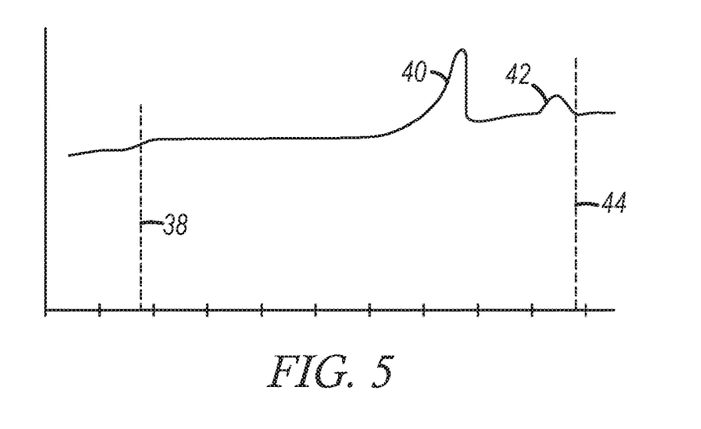
FIG. 5 is a representative DSC curve for a thermotropic liquid crystal polymer in which in which the y-axis represents heat flow and the x-axis represents temperature, and wherein upward movement on the y-axis represents an endothermic event and downward movement on the y-axis represents an exothermic event.

The clearing temperature ($T_C$) of the thermotropic liquid crystal polymer is slightly different than the melting temperature ($T_M$) of the thermoplastic polymer. The clearing temperature ($T_C$) is the temperature above which the liquid crystal polymer is an isotropic liquid that is free of crystalline regions having ordered mesogenic units of the polymer molecules. This particular temperature can be determined by DSC. To help explain the concept of the clearing temperature, a representative liquid crystal polymer DSC curve is illustrated in FIG. 5. As is typical with liquid crystal polymers, the DSC curve depicts a step change at the glass transition temperature (identified by the dashed lined indicated by reference number 38), one or more liquid crystal phase change endotherms 40 that represent shifts between liquid crystal phases such as the smectic and nematic phases, and a melting endotherm 42. The melting endotherm 42, as before, provides thermal information relating to the phase transition of liquid crystal polymer into, upon heating, an isotropic liquid in which the polymer molecules are disordered and the liquid crystal polymer can experience viscous flow. The clearing temperature ($T_C$) of the liquid crystal polymer (identified by the dashed line indicated by reference numeral 44) is the maximum temperature associated with the melting endotherm 42. As such, the liquid crystal polymer exists in a liquid crystal state, which can exhibit various liquid crystal phases or mesophases, between the glass transition temperature and the clearing temperature ($T_C$).

In accordance with various implementations of the composite fusion filament 10, the melting temperature of the thermoplastic polymer may lie anywhere between 160° C. and 350° C., or more narrowly between 240° C. and 300° C., and the clearing temperature of the thermotropic liquid crystal polymer may lie anywhere between 250° C. and 400° C., or more narrowly between 280° C. and 330° C. Some specific examples of preferred thermoplastic polymers for the polymer encasement 12 include polyvinyl chloride, polyvinylidene chloride, polyvinyl acetate, polyvinyl alcohol, polystyrene, acrylonitrile-styrene polymer, acrylonitrile-butadiene-styrene, polyacrylates, polymethacrylate, polyethylene, polypropylene, aliphatic polyamides (PA46, PA6, PA66, PA11, PA12), fully or partially aromatic polyamides, polyacetals, polybenzimidazole, polycarbonate, polyethylene terephthalate, polybutylene terephthalate, polyethylene naphthalate, polyphenyl ethers, polyphenylene oxides, polyphenylene sulfide, polyethersulfones, polyetherether ketones, polyether ketones, polyetherimides, polylactides, polyoxymethylenes, thermoplastic polyurethanes, or a combination or heteropolymer of any two or more of these resins.

The thermotropic liquid crystal polymer may be any aromatic polymer that can transition into and through a liquid crystal state in response to changes in temperature. The thermotropic liquid crystal polymer may be a homopolymer or a heteropolymer. As an example of a suitable homopolymer, the liquid crystal polymer may be a polyester such as poly(hydroxybenzoic acid) and poly(1,4-phenylene terephthalate). And, as an example of a suitable heteropolymer, the liquid crystal polymer may be a co-polyester such as poly(4,4'-dihyroxybiphenyl-co-terephthalic acid), poly(4,4'-dihydroxybiphenyl-co-terephthalic acid-co-isophthalic acid), poly(hydroxybenzoic acid-co-2-hydroxy-6-naphthoic acid), poly(ethylene terephthalate-co-hydroxybenzoic acid), or poly(p-acetoxybenzoic acid-co-ethylene terephthalate). As another example of a suitable heteropolymer, the liquid crystal polymer may be a co-polyester-amide such as poly (6-hydroxy-2-naphthoic acid-co-terephthalic acid-co-4 aminophenol). The example liquid crystal polymers mentioned here, as well as others, are commercially available. Several specific commercially-available liquid crystal polymers that may be employed for use as the one or more mesogenic reinforcement bodies 14 include Vectra® and Zenite® from Celanese Corporation (headquartered in Irving, Tex.), Vectran® from Kuraray America, Inc. (headquartered in Houston, Tex.), and the RTP 3400 series of liquid crystal polymers from RPT Company (headquartered in Winona, Minn.).

While a variety of combinations are certainly possible, the selection and pairing of the thermoplastic polymer and the thermotropic liquid crystal polymer can be tailored for a particular end-use application of the composite fusion filament 10. In one particular application, the thermoplastic polymer is chosen so that its melting temperature is between 240° C. and 280° C., and the thermotropic liquid crystal polymer is chosen so that its clearing temperature is between 280° C. and 310° C., with, of course, the melting temperature being less than the clearing temperature as conditioned above. These temperature ranges provide convenient processing window for using the composite fusion filament 10 as a bonding medium to secure two substrates together when one or both of the substrates is a composite substrate. Some example polymer combinations that meet the above temperature constraints include an aliphatic polyamide, especially PA6 (polycaprolactam) and PA66 (polyhexamethylene adipamide), or polyethylene terephthalate as the thermoplastic polymer, and a co-polyester such as poly (hydroxybenzoic acid-co-2-hydroxy-6-naphthoic acid), poly (ethylene terephthalate-co-hydroxybenzoic acid), poly(p-acetoxybenzoic acid-co-ethylene terephthalate), or poly(6-hydroxy-2-naphthoic acid-co-terephthalic acid-co-4 aminophenol) as the thermotropic liquid crystal polymer.

As noted above, each of the polymer encasement 12 and the one or more mesogenic reinforcement bodies 14 may include a reinforcement filler in addition to the respective thermoplastic and thermotropic liquid crystal polymers. The reinforcement filler can help adjust the mechanical properties the polymer encasement 12 and/or the one or more mesogenic reinforcement bodies 14 if needed. The reinforcement filler may include fibers, particles such as spheres or flakes, or a combination of fibers and particles. Some examples of reinforcement fibers that may be used are carbon fibers, glass fibers (e.g., fiber glass, quartz), basalt fibers, para-aramid fibers (e.g., Kevlar®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton flax, cellulose, spider silk), and combinations of any two or more such fibers. Some examples of reinforcement particles are glass particles and mineral particles including those of talc, wollastonite, calcium carbonate, mica, aluminosilicate clays, halloysites, and combinations of any two or more of such particles.

The exact construction of the composite fusion filament 10 is subject to some variability. In the particular embodiment described here and shown in FIGS. 1-2—in which the composite fusion filament 10 has a circular cross-section when sectioned along the thickness dimension 103—the polymer encasement 12 is in the form of an annular thermoplastic polymer shell 46 that circumscribes the longitudinal axis 22 of the polymer encasement 12. The polymer shell 46 includes an inner circumferential surface 48 and an outer circumferential surface 50 as the outer surface 20. The inner circumferential surface 48 defines an interior cavity 52 while the outer circumferential surface 50 constitutes the exterior of the polymer shell 46 and, consequently, defines the outer diameter 18' (and the thickness 18) of the composite fusion filament 10. The inner and outer circumferential surfaces 48, 50 additionally define a radial thickness 54 of the polymer shell 46. The outer diameter 18' and the radial thickness 54 of the polymer shell 46 can be adjusted as needed, along with other features of the composite fusion filament 10, including the compositions of the thermoplastic polymer and the liquid crystal polymer, to help tune the properties and behavior of the filament 10 for a particular application.

Further, in this embodiment, the one or more mesogenic reinforcement bodies 14 is in the form of a single elongated liquid crystal polymer core 56 that occupies the interior cavity 52 of the annular thermoplastic polymer shell 46 and is coextensive in length with the shell 46. The elongated liquid crystal polymer core 56 is elongated along the longitudinal axis 22 of the polymer encasement 12 and has an exterior surface 58 that defines a thickness 60 of the core 56 in the thickness dimension 103 of the composite fusion filament 10. The exterior surface 58 of the elongated liquid crystal polymer core 56 is surrounded circumferentially by the inner circumferential surface 48 of the polymer shell 46 and may assume any of a number of shapes and surface contours. Here, as shown best in FIG. 2, the elongated liquid crystal polymer core 56 has a circular cross-section when sectioned along the thickness dimension 103, and, consequently, the exterior surface 58 of the core 56 is cylindrical in shape and circular in cross-section with a diameter 60' that defines the thickness 60 of the elongated liquid crystal core 56. Other cross-sectional shapes of the elongated liquid crystal polymer core 56 are certainly possible. The single elongated liquid crystal polymer core 56 may be formed within the annular thermoplastic polymer shell 46 by coextrusion with the heat and shear applied during coextrusion functioning to establish the organized crystalline fibrils 24 with their orientational alignment.

The outer diameter 18' of the annular polymer shell 46 (and thus the filament 10) and the diameter 60' of the elongated liquid crystal polymer core 56 may be varied to adjust the thermal characteristics and behavior of the filament 10. The outer diameter 18' of the shell 46 may, for instance, range from 1.0 mm to 10.0 mm, or more narrowly from 1.75 mm to 6.0 mm, 1.75 mm to 4.5 mm, 1.75 mm to 3.0 mm, or 1.75 mm to 2.85 mm, while at the same time the diameter 60' of the elongated liquid crystal polymer core 56 is such that a ratio ($R_{ArS/ArC}$) of a sectional surface area 62 of the annular polymer shell 46 to a sectional surface area 64 of the elongated liquid crystal polymer core 56 in the thickness dimension 103 of the filament 10 ranges from 0.1 to 20, or more narrowly from 0.2 to 10, 0.5 to 3, or 1 to 2. To arrive at these surface area ratios, a ratio ($R_{DS/DC}$) of the outer diameter 18' of the polymer shell 46 to the diameter 60' of the elongated liquid crystal polymer core 56 may range from 1.05 to 4.6, or more narrowly from 1.1 to 3.3, 1.22 to 2, or 1.41 to 1.73, as summarized in Table 1 below for the broadest range (i.e., 0.1 to 20) of $R_{ArS/ArC}$. While the surface area ratio $R_{ArS/ArC}$ has been presented here in connection with diameters 18', 60', the same surface area ratio ranges are likewise applicable to filament constructions in which the polymer encasement 12 and/or the one or more mesogenic reinforcement bodies 14 have a non-circular cross-section in the thickness dimension 103.

TABLE 1

Summary of Shell and Core Diameters

| Outer Diameter of Shell (mm) | $R_{ArS/ArC}$ | $R_{DS/DC}$ | Diameter of Elongated Core (mm) |
|---|---|---|---|
| 1.0 | 0.1–20 | 1.05–4.6 | 0.22–0.95 |
| 1.75 | 0.1–20 | 1.05–4.6 | 0.38–1.67 |
| 2.85 | 0.1–20 | 1.05–4.6 | 0.62–2.71 |
| 3.0 | 0.1–20 | 1.05–4.6 | 0.65–2.85 |
| 4.5 | 0.1–20 | 1.05–4.6 | 0.98–4.26 |
| 6.0 | 0.1–20 | 1.05–4.6 | 1.30–5.71 |
| 10.0 | 0.1–20 | 1.05–4.6 | 2.17–9.52 |

The composite fusion filament may assume other constructions besides the one described above. For example, FIG. 6 discloses an alternative embodiment of the composite fusion filament, which is identified by reference numeral 110. In the following discussion of this particular embodiment, reference numerals that correspond to the reference numerals used in the description of the previous embodiment will be used to identify the same or similar elements having the same or similar functionality. To that end, the description of aspects of the previously-described embodiment shown in FIGS. 1-2 apply equally to aspects of the following embodiment that are identified with corresponding reference numerals unless specifically described otherwise. In this embodiment, the composite fusion filament 110 includes, as the one or more mesogenic reinforcement bodies 114, a series 166 of elongated liquid crystal polymer cores 156 in axial alignment along the longitudinal axis 122 of the polymer encasement 112, which, as shown, includes an annular polymer shell portion 146 that circumferentially surrounds the series 166 of elongated liquid crystal polymer cores 156. The phrase "in axial alignment along the longitudinal axis" as used herein means that the elongated liquid crystal polymer cores 156 are co-axially aligned end-to-end along the longitudinal axis 122 of the polymer encasement 112 or that the cores 156 are aligned end-to-end and run alongside the longitudinal axis 122 without necessarily satisfying a strict co-axial relationship with the polymer encasement 112.

Figure 6:
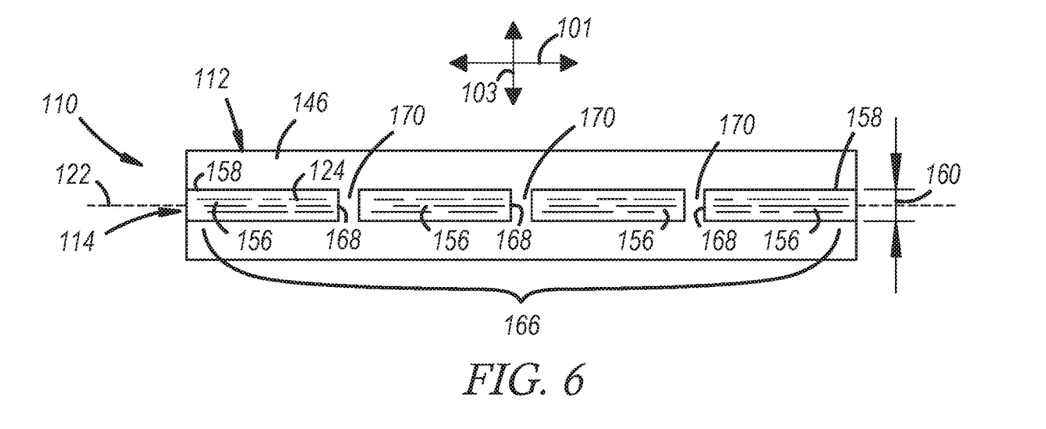
FIG. 6 is a partial cross-sectional view of a composite fusion filament according to an alternative embodiment of the present disclosure with the filament being sectioned along a length dimension.

Each of the elongated liquid crystal polymer cores 156 has the same composition and characteristics—including the presence of the organized crystalline fibrils 124 and the shape and diameter ranges—as the single elongated liquid crystal polymer core 56 described above. Each of the liquid crystal polymer cores 156 is also elongated along the longitudinal axis 122 of the polymer encasement 112 and has an exterior surface 158 that defines a thickness 160 of the core 156 in the thickness dimension 103 of the composite fusion filament 110. In this embodiment, however, the elongated liquid crystal polymer cores 156 are axially aligned within the polymer encasement 112 in that the cores 156 are separated from each other by gaps 168 that are axially spaced apart along the longitudinal axis 122 of the polymer encasement 112. These gaps 168 are occupied by polymer plugs 170 that are integral with the polymer shell portion 146 and extend transversely to the longitudinal axis 122 of the polymer encasement 112 so as to separate the ends of adjacent elongated liquid crystal polymer cores 156. To produce the composite fusion filament 110 of this embodiment, a coextrusion process similar to that employed to produce the filament 10 of FIGS. 1-2 is practiced, although here dislocations are additionally imparted to the single continuous elongated liquid crystal core that results from coextrusion by turning the filament over a tight bend radius or periodically crimping the filament down its length to form the series 166 of axially aligned elongated liquid crystal polymer cores 156.

Figure 7:
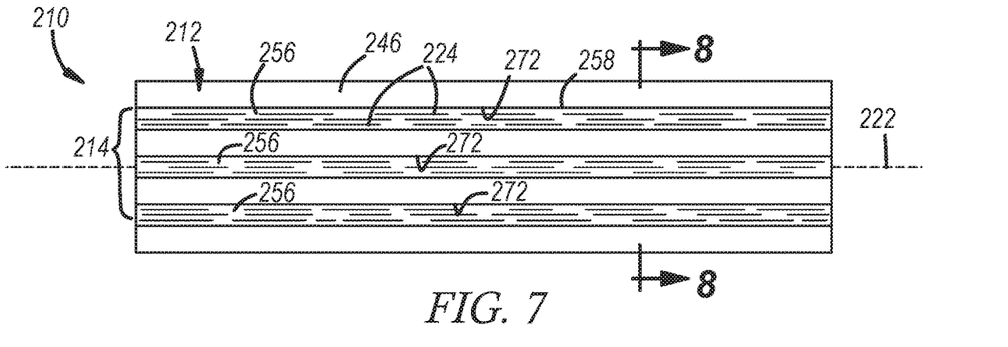
FIG. 7 is a partial cross-sectional view of a composite fusion filament according to another alternative embodiment of the present disclosure with the filament being sectioned along a length dimension.
Figure 8:
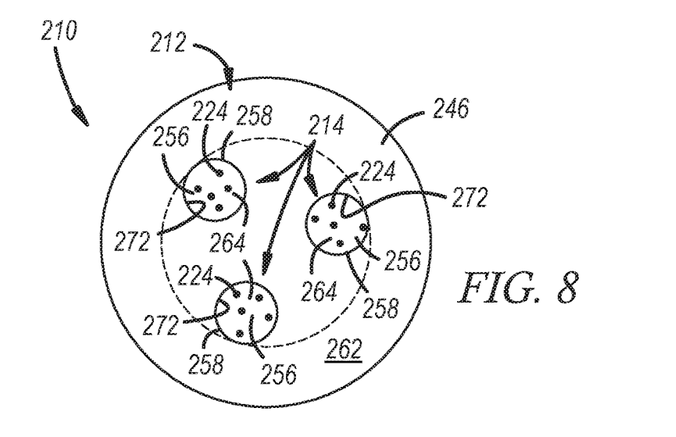
FIG. 8 is a cross-sectional view of the composite fusion filament according to the embodiment of FIG. 6 with the filament being sectioned along a thickness dimension taken at section lines 8-8 of FIG. 7.
Figure 9:
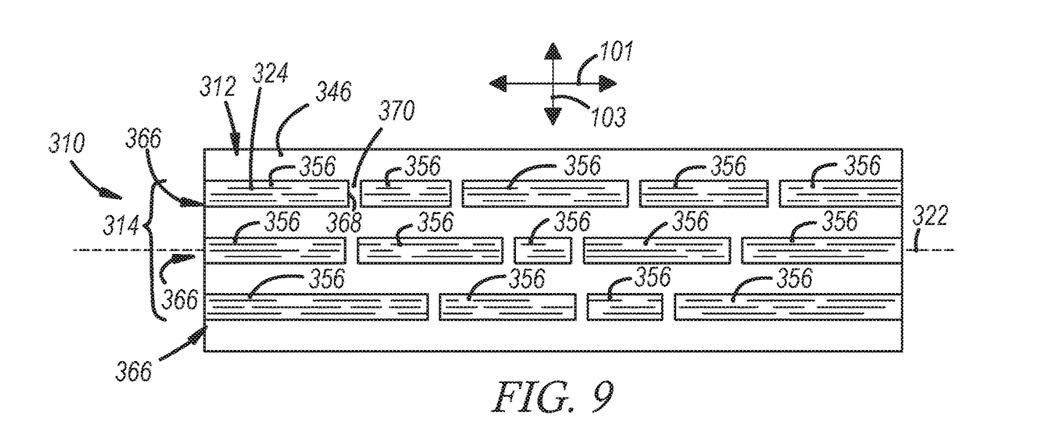
FIG. 9 is a partial cross-sectional view of a composite fusion filament according to yet another alternative embodiment of the present disclosure with the filament being sectioned along a length dimension.

FIGS. 7-8 disclose another alternative embodiment of the composite fusion filament, which is identified by reference numeral 210. In this embodiment, the one or more mesogenic reinforcement bodies 214 is in the form of a plurality of continuous elongated liquid crystal polymer cores 256 that are spaced apart within the polymer encasement 212, which, as shown, may include an annular polymer shell portion 246 that circumferentially surrounds the plurality of continuous elongated liquid crystal polymer cores 256. Each of the continuous elongated liquid crystal polymer cores 256 is elongated along the longitudinal axis 222 of the polymer encasement 212 and is coextensive in length with the polymer encasement 212. Each of the continuous elongated liquid crystal polymer cores 256 has the same composition and characteristics—including the presence of the organized crystalline fibrils 224—as the single elongated liquid crystal polymer core 56 described above. Accordingly, the polymer encasement 212 defines a plurality of spaced apart interior cavities 272 as opposed to a single interior cavity. Each of the interior cavities 272 is preferably circular in cross-section and occupied by an elongated liquid crystal polymer core 256 that has an exterior surface 258. The exterior surfaces 258 of the elongated liquid crystal polymer cores 256 may be cylindrical in shape and circular in cross-section. As for the diameter of the plurality of continuous elongated cores 256, the ratio ($R_{ArS/ArC}$) of the sectional surface area 262 of the polymer encasement 212 to the combined sectional surface area 264 of the cores 256 in the thickness dimension 103 of the filament 210 still ranges from 0.1 to 20, or more narrowly from 0.2 to 10, 0.5 to 3, or 1 to 2. The composite fusion filament 210 of this embodiment may be formed by a modified coextrusion process that the desired number of continuous elongated liquid crystal polymer cores 256 within the polymer encasement 212 and surrounded by the annular shell portion 246.

FIG. 9 discloses another alternative embodiment of the composite fusion filament, which is identified by reference numeral 310. Here, the one or more mesogenic reinforcement bodies 314 is in the form of multiple series 366 of elongated liquid crystal polymer cores 356 in axial alignment along the longitudinal axis 322 of the polymer encasement 312, which, as shown, may include an annular polymer shell portion 346 that circumferentially surrounds the multiple series 366 of axially aligned elongated liquid crystal polymer cores 356. Each series 366 of axially aligned elongated liquid crystal polymer cores 356 is the same as the series 166 of elongated cores 156 described above in connection with FIG. 7. In that regard, the axially aligned liquid crystal polymer cores 356 in each series 366 are separated by gaps 368 that are occupied by polymer plugs 370 that are integral with the annular shell portion 346 of the polymer encasement 312. Anywhere from 2 to 20 series 366 of axially aligned elongated liquid crystal polymer cores 356 may be present within the polymer encasement 312. Additionally, as before, the ratio ($R_{ArS/ArC}$) of the sectional surface area of the polymer encasement 312 to the combined sectional surface area of the cores 356 in the thickness dimension 103 of the filament 310 may satisfy the same ranges. To produce the composite fusion filament 310 of this embodiment, the coextrusion process similar to the one employed to produce the filament 210 of FIG. 7 is practiced, although here dislocations are additionally imparted to the plurality of continuous elongated liquid crystal cores that results from coextrusion in the same ways detailed above to form the multiple series 366 of axially aligned elongated cores 356.

The composite fusion filaments 110, 210, 310 of the various alternative embodiments may have properties or characteristics that are more appropriately suited for certain uses compared to the composite fusion filament 10 depicted in FIGS. 1-2. For example, the composite fusion filaments 110, 310 that include one or more series 166, 366 of axially aligned elongated liquid crystal polymer cores 156, 356 may have enhanced flexibility and, thus, be easier to bend and/or compress, due to the intermittent breaks that are present between the aligned cores 156, 356. As another example, the composite fusion filament 210 that include a plurality of continuous elongated liquid crystal cores 256 may allow for certain regions of the filament 210 to have its properties dominated more by the elongated liquid crystal cores 256 or the polymer encasement 212 by grouping the elongated liquid crystal cores 256 off center within the polymer encasement 212, spacing the cores 256 at varying distances relative to each other, varying the thickness and/or cross-sectional shape across the cores 256 based on their location within the polymer encasement 212, or some combination of the above. Of course, those skilled in the art will appreciate that other differences may exist between the various composite fusion filament embodiments disclosed herein that may make any one of the filaments 10, 110, 210, 310 more desired for a particular application.

Figure 10:
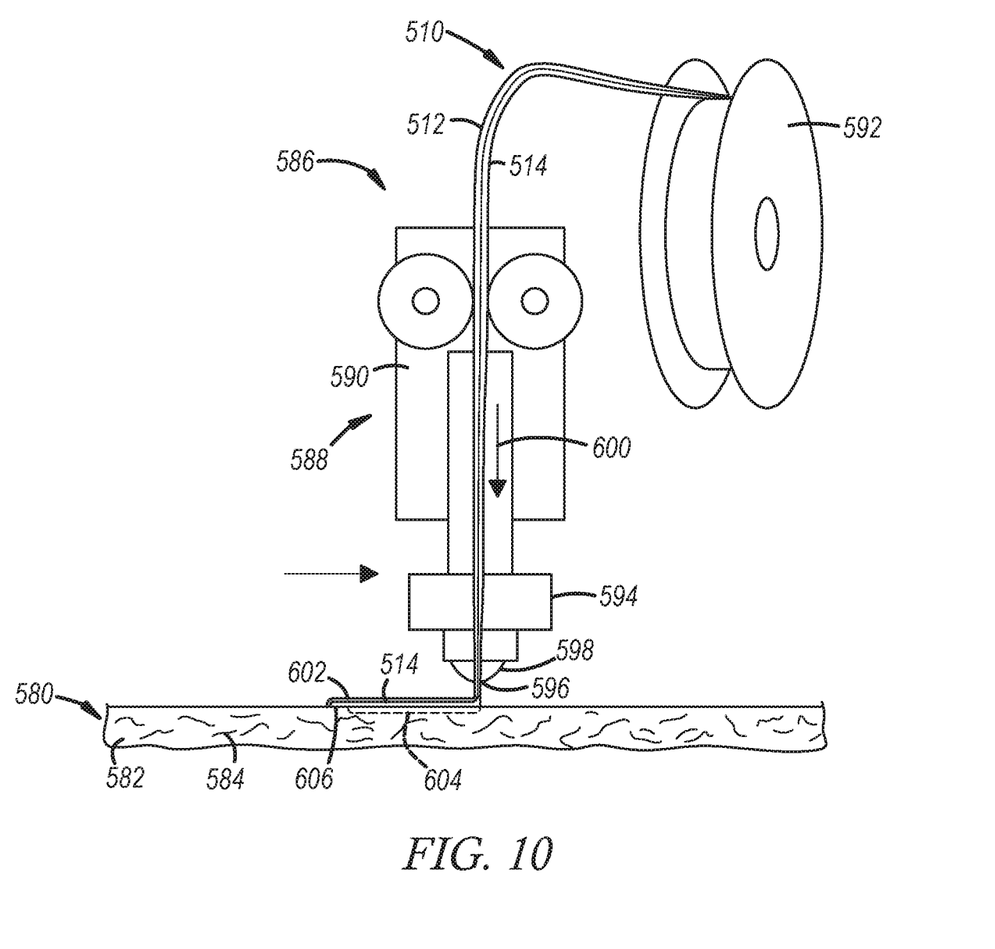
FIG. 10 is an elevated cross-sectional illustration of a fusion deposition apparatus operable to deposit a composite fusion filament as described in various embodiments of the present disclosure onto a substrate that comprises a compatible thermoplastic polymer.

The composite fusion filament 10, 110, 210, 310 can be used for a variety of purposes including (1) bonding together a pair of workpiece members when at least one, and preferably both, of the workpiece members is a composite workpiece member that includes a thermoplastic polymer matrix, and (2) additively manufacturing a three-dimensional article by building the article layer-by-layer such that each applied layer (except the first layer) is added onto a partially-formed and growing article that contains a consolidated thermoplastic polymer. Referring now to FIG. 10, the use of the composite fusion filament for such applications as well as others is illustrated. In FIG. 10, the several described versions of the composite fusion filament 10, 110, 210, 310 are identified collectively by reference numeral 510 while the various structural components of the filament 510 are likewise identified by 500 series reference numerals that collectively correspond to the same or similar structural components of the various embodiments described above.

The composite fusion filament 510 is shown being deposited onto a substrate 580 and forming a polymer bond with the substrate 580. The substrate 580 includes a thermoplastic polymer 582 and may assume any of a wide variety of constructions including a single composite workpiece member, a pair of composite workpiece members that are held together, a growing article being manufactured by fused deposition modeling, or any other thermoplastic polymer-containing object. The thermoplastic polymer 582 of the substrate 580 may be any of the thermoplastic polymers listed above in connection with the polymer encasement 512 of the composite fusion filament 510. Also, in some instances, the substrate 580 may additionally include a reinforcing phase 584 distributed within a matrix of the thermoplastic polymer 582. The reinforcing phase 584 may be fibers (as shown) or particles that are embedded within the matrix 582. The reinforcing phase 584 may, for example, include carbon fibers and/or glass fibers, among other options.

The composite fusion filament 510 may be heated and deposited onto the substrate 580 by a fusion deposition apparatus 586. The fusion deposition apparatus 586 includes a deposition head 588 that is movable relative to the substrate 580 under computer control. The deposition head 588 includes a wire feeder 590 that uses gear- or roller-based torque to pull the composite fusion filament 510 from a spool 592 and to push it through a liquefier 594 and out of an opening 596 of a nozzle 598 that may be constricted. The liquefier 594 heats the composite fusion filament 510 to a processing temperature and can be designed to supply heat to the filament 510 in any of a wide variety of way including, for example, through a resistive heating coil contained within the liquefier 594. The feed rate of the composite fusion filament 510 into the liquefier 594 is typically controlled by a step motor. To help ensure a strong and durable polymer bond is formed between the composite fusion filament 510 and the substrate 580, the thermoplastic polymer of the polymer encasement 512 of the filament 510 is selected to be compatible with the thermoplastic polymer 582 of the substrate 580. And, as mentioned previously, the various thermoplastic polymers are compatible if they are the same polymer composition or if they are miscible with each other.

The composite fusion filament 510 is fed through the liquefier 594 in a feeding direction 600 and, when in the liquefier 594, is heated to a processing temperature that is above the melting temperature ($T_M$) of the thermoplastic polymer that comprises the polymer encasement 512 yet below the clearing temperature ($T_C$) of the thermotropic liquid crystal polymer that comprises the one or more mesogenic reinforcement bodies 514. In this way, the liquefier 594 melts the polymer encasement 512 of the composite fusion filament 510 but does not melt the one or more mesogenic reinforcement bodies 514 into an isotropic liquid. The one or more mesogenic reinforcement bodies 514 are instead maintained in a liquid crystal phase and, thus, remain structurally intact while exhibiting anisotropy as the filament 510 is passed through the liquefier 594. As such, when the composite fusion filament 510 is fed through the nozzle 598 and onto the substrate 580 while at the processing temperature, the polymer encasement 512 is in molten or liquefied form. And, although in molten form, the polymer encasement 512 still covers the one or more mesogenic reinforcement bodies 514; it is just in a less viscous and more flowable state.

The composite fusion filament 510 is deposited onto the substrate 580 in any desired pattern by relative movement between the movable deposition head 588 and the substrate 580. As the composite fusion filament 510 comes into contact with the substrate 580 while the filament 510 is at its processing temperature, heat is transferred from the filament 510 to the substrate 580 at the interface of the filament 510 and the substrate 580. More specifically, heat is transferred from a deposited molten form 602 of the polymer encasement 512 of the filament 510 to the substrate 580 including the thermoplastic polymer 582 of the substrate 580. In fact, enough heat is transferred to the substrate 580 that a contact portion 604 of the thermoplastic polymer 582 of the substrate 580 melts to a depth within the substrate 580. The melted contact portion 604 of the thermoplastic polymer 582 intermixes with the deposited molten form 602 of the polymer encasement 512. Eventually, after period of time, the contact portion 604 of the thermoplastic polymer 582 and the deposited molten form 602 of the polymer encasement cool and harden to form an interconnected polymer bond 606. The polymer bond 606 may be structurally reinforced by the one or more mesogenic reinforcement bodies 514 that become subsumed by the polymer bond 606 as the bond 606 hardens in place.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A composite fusion filament comprising:
a polymer encasement having a longitudinal axis along which a length of the composite fusion filament is defined, the polymer encasement being comprised of a thermoplastic polymer that has a melting temperature;
one or more mesogenic reinforcement bodies contained within the polymer encasement, the one or more mesogenic reinforcement bodies being comprised of a thermotropic liquid crystal polymer having organized crystalline fibrils exhibiting orientation alignment along the longitudinal axis by being aligned lengthwise along the longitudinal axis of the polymer encasement such that a director of the organized crystalline fibrils runs parallel to the longitudinal axis, the thermotropic liquid crystal polymer of the one or more mesogenic reinforcement bodies having a clearing temperature that is greater than the melting temperature of the thermoplastic polymer of the polymer encasement, the fibrils being axially and radially spaced apart from each other such that the fibrils are interleaved by which one or more fibrils overlaps with one or more other fibrils relative to the longitudinal axis.

2. The composite fusion filament set forth in claim 1, wherein the melting temperature of the thermoplastic polymer is between 160° C. and 350° C., and the clearing temperature of the thermotropic liquid crystal polymer is between 250° C. and 400° C.

3. The composite fusion filament set forth in claim 1, wherein the melting temperature of the thermoplastic polymer is between 240° C. and 280° C., and the clearing temperature of the thermotropic liquid crystal polymer is between 280° C. and 310° C.

4. The composite fusion filament set forth in claim 1, wherein the thermoplastic polymer is an aliphatic polyamide or polyethylene terephthalate.

5. The composite fusion filament set forth in claim 1, wherein the thermotropic liquid crystal polymer is poly(hydroxybenzoic acid) or poly(1,4-phenylene terephthalate).

6. The composite fusion filament set forth in claim 1, wherein the thermotropic liquid crystal polymer is a co-polyester.

7. The composite fusion filament set forth in claim 6, wherein the thermotropic liquid crystal polymer is poly(4,4'-dihyroxybiphenyl-co-terephthalic acid), poly(4,4'-dihydroxybiphenyl-co-terephthalic acid-co-isophthalic acid), poly(hydroxybenzoic acid-co-2-hydroxy-6-naphthoic acid), poly(ethylene terephthalate-co-hydroxybenzoic acid), or poly(p-acetoxybenzoic acid-co-ethylene terephthalate).

8. The composite fusion filament set forth in claim 1, wherein the thermotropic liquid crystal polymer is a co-polyester-amide.

9. The composite fusion filament set forth in claim 8, wherein the thermotropic liquid crystal polymer is poly(6-hydroxy-2-naphthoic acid-co-terephthalic acid-co-4 aminophenol).

10. The composite fusion filament set forth in claim 1, wherein, when the composite fusion filament is sectioned perpendicular to the length of the filament, a ratio of a sectional surface area of the polymer encasement to a sectional surface area of the one or more mesogenic reinforcement bodies ranges from 0.1 to 20.

11. The composite fusion filament set forth in claim 1, wherein the ratio of the sectional surface area of the polymer encasement to the sectional surface area of the one or more mesogenic reinforcement bodies ranges from 1 to 2.

12. The composite fusion filament set forth in claim 1, wherein the polymer encasement has a thickness that ranges from 1.0 mm to 10.0 mm.

13. The composite fusion filament set forth in claim 1, wherein the polymer encasement has an outer surface that defines an outer diameter of the composite fusion filament.

14. The composite fusion filament set forth in claim 1, wherein the polymer encasement is an annular polymer shell, and wherein the one or more mesogenic reinforcement bodies is a single elongated liquid crystal polymer core that is surrounded circumferentially by the annular polymer shell and is coextensive in length with the annular polymer shell.

15. The composite fusion filament set forth in claim 1, wherein the polymer encasement includes an annular polymer shell portion, and the one or more mesogenic reinforcement bodies is a series of elongated liquid crystal polymer cores that are in axial alignment along the longitudinal axis of the polymer encasement.

16. The composite fusion filament set forth in claim 1, wherein the polymer encasement includes an annular polymer shell portion, and the one or more mesogenic reinforcement bodies is a plurality of continuous elongated liquid crystal polymer cores that are spaced apart within the polymer encasement and surrounded by the annular polymer shell portion of the polymer encasement, each of the plurality of continuous elongated liquid crystal polymer cores being coextensive in length with the polymer encasement.

17. The composite fusion filament set forth in claim 1, wherein the polymer encasement includes an annular polymer shell portion, and the one or more mesogenic reinforcement bodies is multiple series of elongated liquid crystal polymer cores that are in axial alignment along the longitudinal axis of the polymer encasement.

18. A method of depositing a composite fusion filament, the method comprising:
feeding a composite fusion filament to a fusion deposition head that includes a liquefier and a nozzle, the composite fusion filament comprising a polymer encasement and one or more mesogenic reinforcement bodies contained within the polymer encasement, the polymer encasement having a longitudinal axis along which a length of the composite fusion filament is defined, the polymer encasement being comprised of a thermoplastic polymer having a melting temperature, and the one or more mesogenic reinforcement bodies being comprised of a thermotropic liquid crystal polymer having organized crystalline fibrils exhibiting orientation alignment along the longitudinal axis by being aligned lengthwise along the longitudinal axis of the polymer encasement such that a director of the organized crystalline fibrils runs parallel to the longitudinal axis, the thermotropic liquid crystal polymer having a clearing temperature that is greater than the melting temperature of the thermoplastic polymer, the fibrils being axially and radially spaced apart from each other such that the fibrils are interleaved by which one or more fibrils overlaps with one or more other fibrils relative to the longitudinal axis;

heating the composite fusion filament in the liquefier to a processing temperature that is above the melting temperature of the thermoplastic polymer of the polymer encasement yet below the clearing temperature of the thermotropic liquid crystal polymer of the one or more mesogenic reinforcement bodies;

depositing the composite fusion filament onto a substrate comprising a thermoplastic polymer that is compatible with the thermoplastic polymer of the polymer encasement of the composite fusion filament; and allowing a deposited molten form of the polymer encasement of the composite fusion filament and a melted contact portion of the thermoplastic polymer of the substrate to harden into a polymer bond.

* * * * *